United States Patent [19]

Kramer

[11] Patent Number: 4,809,631
[45] Date of Patent: Mar. 7, 1989

[54] COMPOSITE RUDDER SEAL

[75] Inventor: James H. Kramer, Akron, Ohio

[73] Assignee: The B. F. Goodrich Company, Akron, Ohio

[21] Appl. No.: 150,672

[22] Filed: Feb. 1, 1988

Related U.S. Application Data

[63] Continuation-in-part of Ser. No. 112,649, Oct. 26, 1987.

[51] Int. Cl.$^4$ .............................................. B63B 3/40
[52] U.S. Cl. ................................. 114/169; 114/162; 277/187; 384/300; 384/908
[58] Field of Search ............... 114/162, 169; 277/187, 277/188, 156; 384/98, 297, 300, 908

[56] References Cited

U.S. PATENT DOCUMENTS

| | | | |
|---|---|---|---|
| 3,743,306 | 7/1973 | Kramer | 277/187 |
| 4,473,308 | 9/1984 | Kramer | 384/98 |
| 4,585,359 | 4/1986 | Kramer | 384/98 |
| 4,596,471 | 6/1986 | Kramer | 384/98 |

Primary Examiner—Sherman D. Basinger
Assistant Examiner—Thomas J. Brahan
Attorney, Agent, or Firm—Joseph Januszkiewicz

[57] ABSTRACT

A bearing assembly for use on a rudder shaft of a vessel or boat wherein the shaft has a thin cylindrical rubber sleeve that encompasses it. The outer peripheral surface of the rubber sleeve is bonded to a fiberglass ring which is bonded to an elongated annular rubber member which is in sliding contact with the inner peripheral surface of a teflon ring which is turn is bonded to the inner peripheral surface of a fiberglass sleeve. The latter sleeve in turn is bonded to the inner periphery of the upper end of a housing that is attached to the hull of a vessel. The lower portion of the rudder shaft has secured to it an annular rubber bearing that is in frictional sliding contact with a teflon ring that is secured to the inner peripheral surface of the lower end of the housing.

14 Claims, 8 Drawing Sheets

COMPOSITE RUDDER SEAL

BACKGROUND OF THE INVENTION

This is a continuation-in-part of copending application Ser. No. 112,649 filed on Oct. 26, 1987.

This invention relates to shaft seals and more particularly to seals for use on an oscillating shaft subjected to fluid pressures.

Seals for oscillatory shafts such as for use on rudder shafts which are manually turned where fluid pressure is a constant factor have proved difficult because of the necessity to maintain a positive fluid tight seal between the rotative and stationary parts while requiring the maintenance of a minimal load therebetween. This is essential to permit ease of maneuvering of the steering shaft. It is important to provide a responsive feel to the turning of the rotative shaft without encountering a stiff or binding feel to the steering effort. The present seals for rudder shafts of smaller vessels generally use flex packing that is compressed between a rotating and stationary member. In time, the packing assumes a set and thereafter even though the compressive forces on the flex packing is increased there is a leakage problem. The leakage must be pumped or bailed from the hold of the vessel presenting an undesirable condition and one that requires the expenditure of time. The present invention provides a positive means for significantly extending the useful life cycle of the rudder seal while enhancing the responsiveness of the rudder shaft in its steering effort. Further, such sealing means permits the retrofitting of existing rudder sealing means in a facile manner.

SUMMARY OF THE INVENTION

A bearing assembly for use on the rudder shaft providing excellent sealing while permitting ease of maneuvering of the rudder shaft. The shaft is journaled in a cylindrical housing that is secured in a vertical position within the hull of the vessel. The shaft has a thin rubber sleeve encompassing it. The sleeve in turn has its outer peripheral surface bonded to a fiberglass ring which is bonded to an annular rubber member, which is under compression. The rubber member is in sliding contact with a teflon ring which is bonded to a fiberglass sleeve that is secured to the cylindrical housing. The lower portion of the rudder shaft has an annular rubber bearing secured to it which in turn is in frictional contact with a teflon ring secured to the inner peripheral surface of the lower end of the housing. Such bearing assembly permits its use as a retrofitting bearing unit.

DETAILED DESCRIPTION

Figure 1:
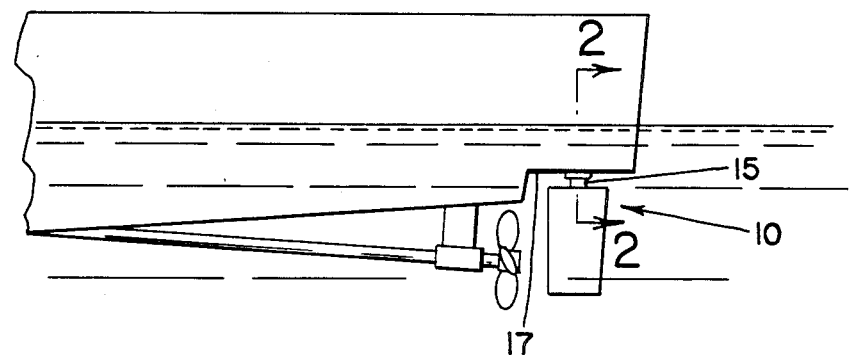
FIG. 1 is a side elevational view of the stern portion of a vessel showing the arrangement of the steering rudder.
Figure 2:
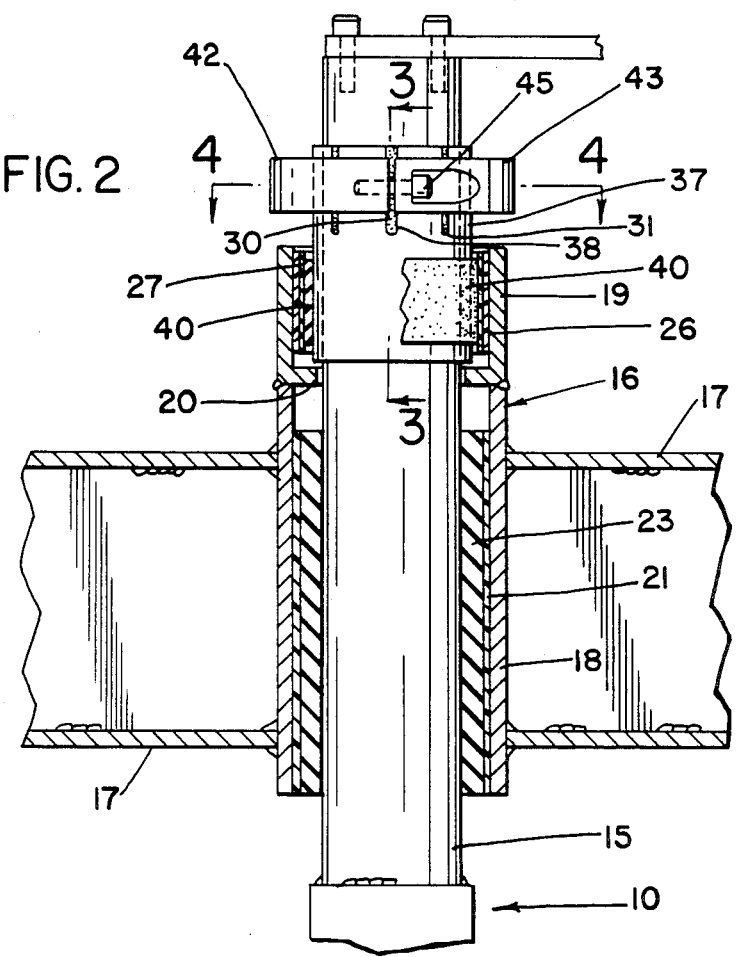
FIG. 2 is an enlarged sectional view taken on line 2—2 of FIG. 1 showing the details of a bearing assembly, rudder shaft and its sealing means.

Referring to the drawings, wherein like reference numerals designate like or corresponding parts throughout the several views, there is shown in FIG. 1 (which illustrates a preferred embodiment), a ship's rudder or vessel rudder 10 attached pivotally to the vessel by a steering shaft 15 which operates in a bearing assembly enclosed in a tubular housing or outer pipe 16. As seen in FIG. 2 housing or outer pipe 16 is suitably attached, as by welding to the hull 17 of the ship or vessel. Housing or outer pipe 16 has a lower cylindrical portion 18 that extends through the hull and an upper cylindrical portion 19 with a flange 20 extending radially inwardly at the juncture of such upper cylindrical portion 19 and the lower cylindrical portion 18. Located within the inner bore of the lower cylindrical portion 18 of pipe 16 is a bearing element having an outer shell 21 and an inner rubber or elastomeric bearing 23. The outer shell 21 can be brass or other metal or a fiberglass epoxy tube. Such rubber bearing 23 is suitably bonded or secured to the outer shell 21, which outer shell 21 is then secured as by a set screw (not shown) to the outer pipe 16 or bonded to the inner peripheral surface of the inner bore of the lower cylindrical portion 18. The rubber bearing 23 may be a single annular member as in U.S. Pat. No. 3,993,371 or a plurality of circumferentially spaced blocks of rubber or staves thus leaving water courses between the staves as illustrated by U.S. Pat. No. 4,596,471 and U.S. Pat. No. 3,993,371.

Figure 3:
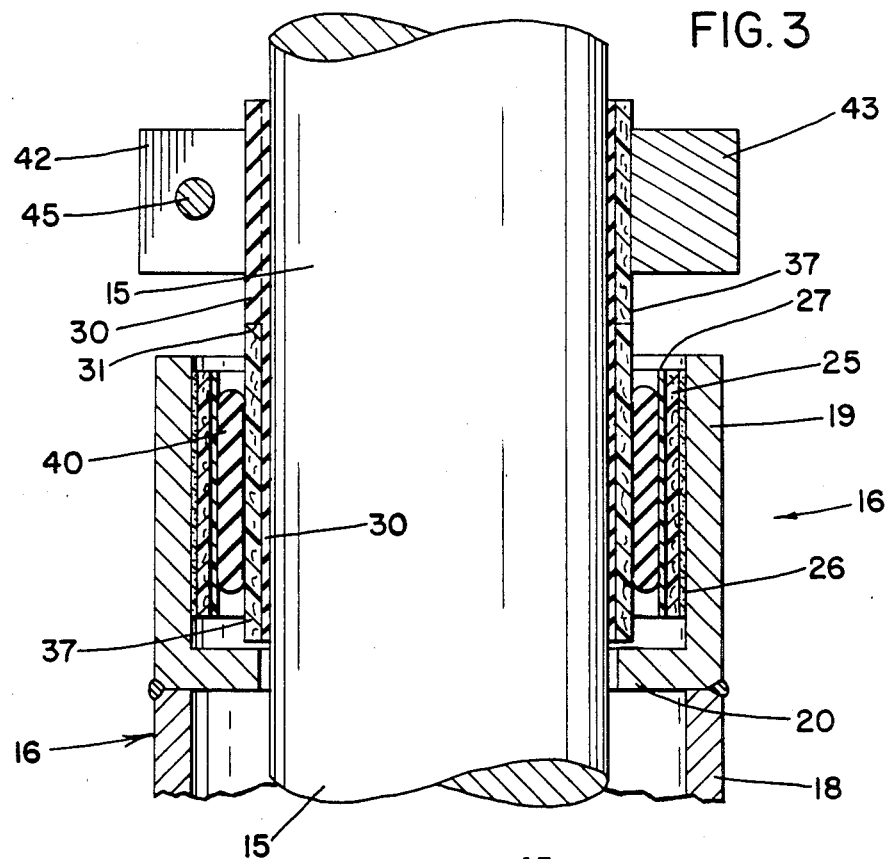
FIG. 3 is a further enlarged sectional view of the upper portion of the of the bearing assembly and sealing means showing the sealing means in cross section taken on line 3—3 of FIG. 2.

The upper cylindrical portion 19 of outer pipe or tubular housing 16 has a fiberglass sleeve 25 cemented to its inner peripheral surface wherein the cement is designated as a film 26 (in FIG. 3). An annular Teflon ® ring 27 has its outer peripheral surface suitably bonded to the fiberglass sleeve 25 to provide a smooth stationary surface for the rotating seal to be described to slide on while maintaining a fluid tight seal.

Figure 5:
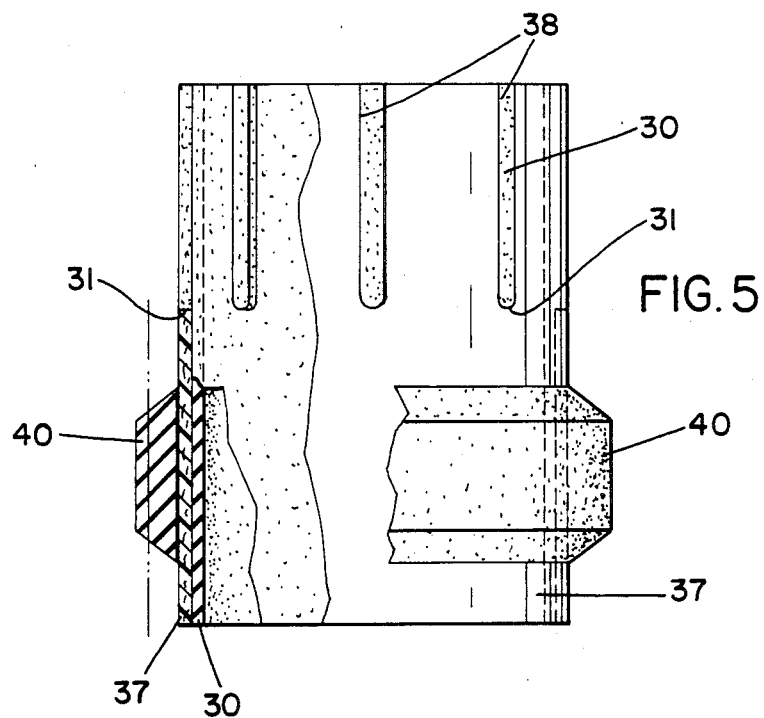
FIG. 5 is a side elevational view partly in cross section of the sealing means showing the tubular insert and its annular elastomeric seal.

The rotatable steering shaft 15 has an annular rubber sleeve 30 suitably mounted thereon substantially in alignment with the rubber sleeve or bearing 23 in the lower cylindrical portion 18 of pipe 19 and extending upwardly therefrom. Such rubber sleeve 30 has thicker portions on its upper end as seen in FIG. 3 to provide a shoulder 31 on its outer surface for a purpose to be described. A fiberglass ring 37 is formed onto the rubber sleeve 30 to thereby interconnect the fiberglass ring 37 and the rubber sleeve 30 into an integral unit to permit a sliding fit of the unit onto shaft 15. Fiberglass ring 37 has a plurality of circumferentially spaced slits 38 along its upper portion such that on bonding the rubber sleeve 30 onto fiberglass ring 37 will permit the rubber to flow into the slits 38 to assure an integral unitary whole. Such flowing of the rubber into the slits 38 represents the thicker portions on the upper end of the rubber sleeve 30 as mentioned above. A rubber ring 40 is then placed onto the fiberglass ring 37 with its inner peripheral surface bonded to the lower portion of fiberglass ring 37 to form a complete unitary seal for the bearing assembly. Such bearing assembly can be used as a replacement unit as well as an original built unit. The rubber ring 40 is under compression after installation on shaft 15 and has its outer surface in sliding contact with the Teflon ® ring 27 assuring a leakproof interior from the water surrounding the hull of the ship and the rudder 10 and its steering shaft 15. FIG. 5 illustrates the integral unit of the fiberglass ring 37, the sleeve 30 and the rubber ring 40 in its relaxed state. At assembly, the rubber ring 40 is compressed between 5 to 30% of its free thickness. The resulting pressure exceeds the water pressure that is attempting to enter the vessel's hull via the central bore in the cylindrical housing or outer pipe 19. The rubber ring 40 under the compressive forces exerts a force that is normal to the Teflon ® ring, which normal force must be overcome before the rubber ring 40 slips relative to the Teflon ® ring, however for small angular rotations of the rudder shaft 15, the rubber ring 40 will twist through an angle before it slips on the Teflon ring 27 thus enhancing the life of the bearing assembly described.

The upper portion of shaft 15, the rubber sleeve 30 and the fiberglass ring 37 are clamped between a pair of semi-circular members 42 and 43 by bolts 45 for suitable connection to the steering mechanism of shaft 15. With the upper portion of the fiberglass ring 37 slit as at 38 and these voids filled with rubber during the molding process of making ring 37 integral with annular rubber sleeve 30, the clamping by the semicircular members 42 and 43 assures a fluid tight fit while permitting the bearing assembly's use as a retrofit unit.

Figure 6:
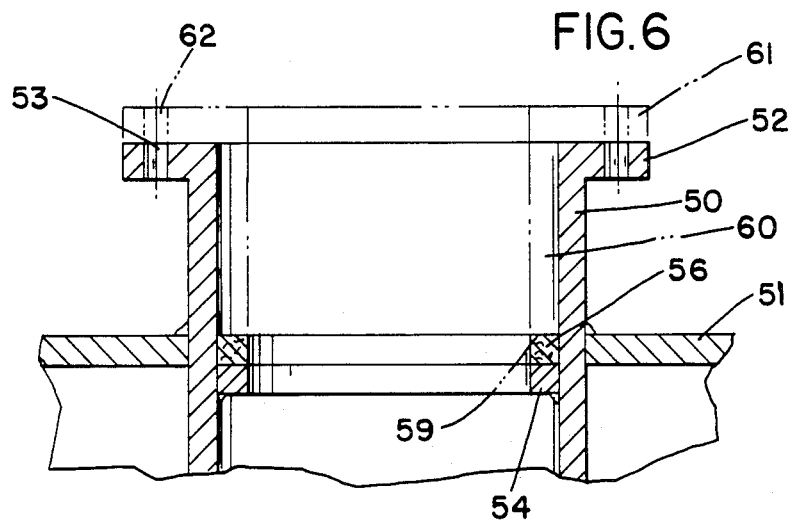
FIG. 6 is a fragmentary sectional view of a portion of a rudder shaft housing and hull similar to FIG. 2.
Figure 7:
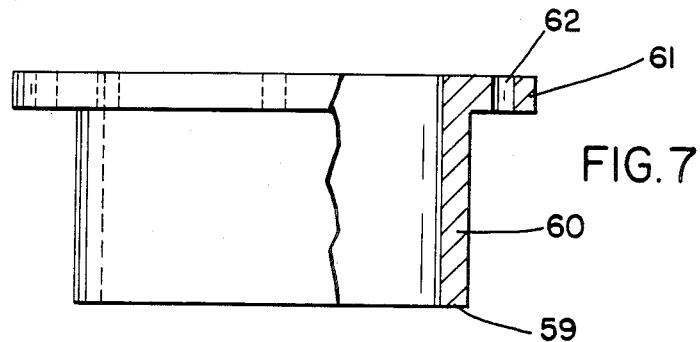
FIG. 7 is a side elevational view of a tubular support for use in the rudder shaft housing of FIG. 6.
Figure 8:
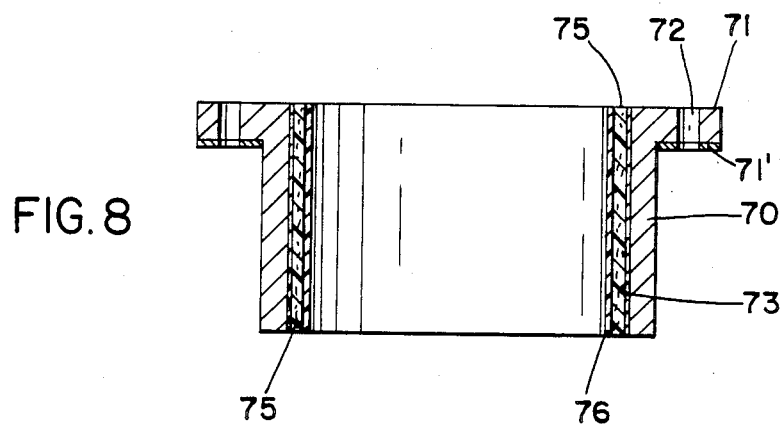
FIG. 8 is a side elevational view in cross-section of a tubular support made in accordance with the principles of the invention showing a modified form of the invention illustrated in FIGS. 1-5.
Figure 9:
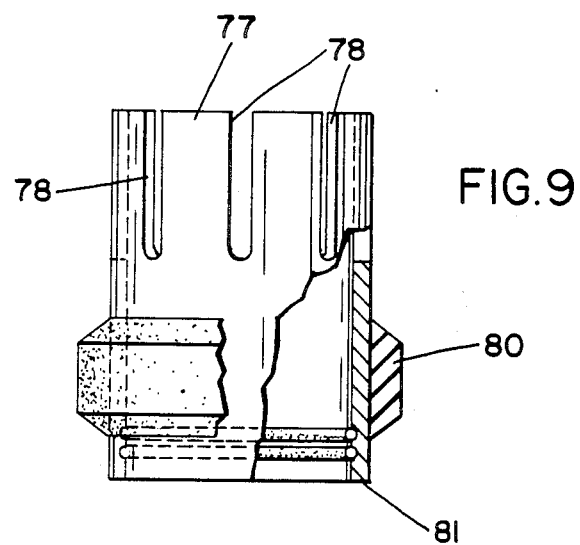
FIG. 9 is a side elevational view partly in cross-section of a rudder shaft seal and support for use with the tubular support of FIG. 8.
Figure 10:
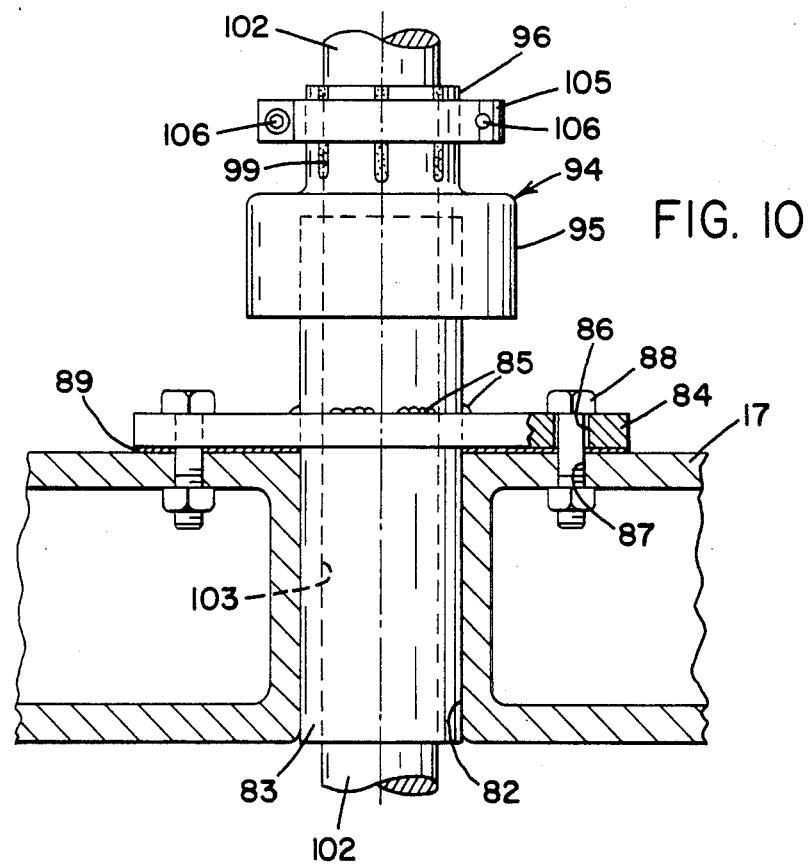
FIG. 10 is a side elevational view of a modified form of the bearing assembly for a steering shaft.
Figure 12:
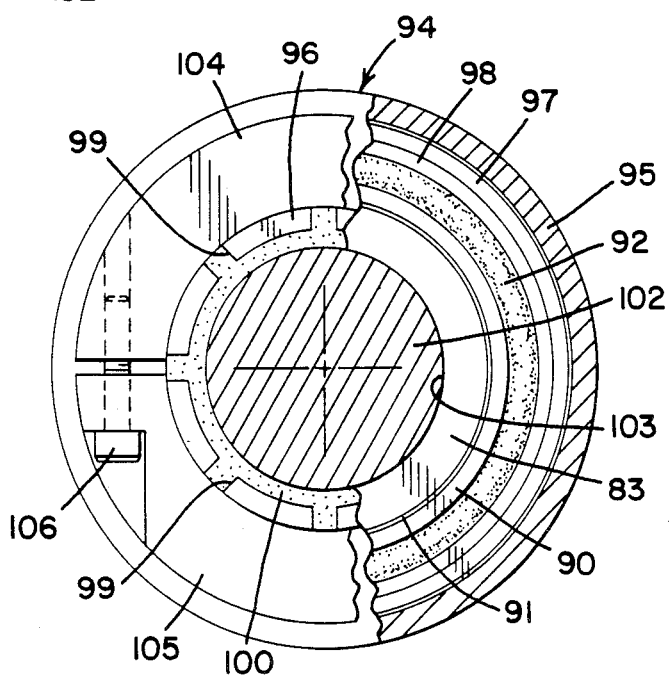
FIG. 12 is a plan view of the bearing assembly and shaft taken on line 12—12 of FIG. 11.

A modification of the above described invention is illustrated in FIGS. 7 and 8, which modification is particularly adapted for use in retrofitting the bearing assemblies of boats as illustrated in FIG. 6. Therein a housing or outer metal pipe 50 is suitably attached as by welding to the hull 51 of a ship or vessel. Such outer metal pipe 50 has an annular flange 52 with a plurality of circumferentially spaced bores 53. In such conventional construction of a bearing assembly, an annular ring 54 is located within the inner periphery of the outer metal pipe 50 connected thereto as by welding. Flax packing in the form of an annular flax ring 56 is positioned onto the annular ring 54 such that one end 59 of a cylindrical pipe 60 (FIG. 7) abuts the flax ring 56. Cylindrical pipe 60 has a flange 61 at the other end with a plurality of circumferentially spaced bores 62 in alignment with circumferentially spaced bores 53. In conventional practice the rudder shaft is inserted into the central bore of the cylindrical metal pipe 60, after pipe 60 is located on the housing or outer pipe 50, and as the cylindrical metal pipe 60 is drawn down onto outer pipe 50 by tightening the bolts that would interconnect the aligned bores 53 and 62, the one end 59 of metal pipe 60 would exert pressure of the flax packing ring 56 which in turn would flatten out and seal the rudder shaft. After numerous re-tightening of the bolts that interconnect the cylindrical metal pipe 60 and the outer metal pipe 50, annular flax packing ring 56 assumes a set and will no longer provide for the sealing of the rudder shaft. The modified seal of FIGS. 8 and 9 are substituted for the cylindrical pipe 60 and the flax packing ring 56. Shown in FIG. 8 is a cylindrical metal pipe 70 with a flange 71 and a gasket 71' on one end with a plurality of circumferentially spaced bores 72 and an inner bore 73. The inner surface of bore 73 of metal pipe 70 has a fiberglass ring 75 cemented thereto. Suitably mounted onto and secured to the inner peripheral surface of fiberglass ring 75 is a low friction ring 76 such as Teflon ®. Such metal pipe 70 with its inner fiberglass ring 75 and Teflon ® ring 76 is substituted for the outer metal pipe 60. The gasket 71' seals the pipe 70 from leaking.

Figure 4:
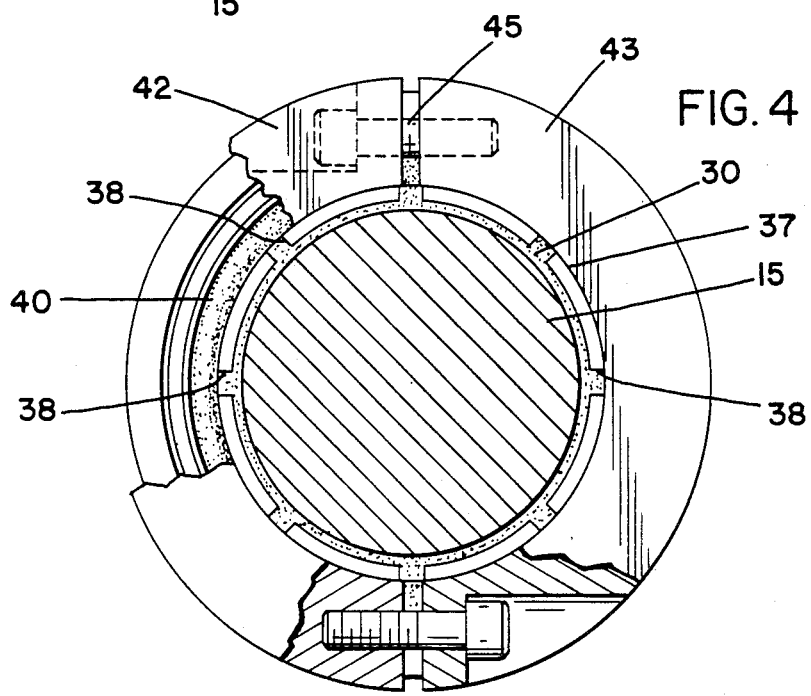
FIG. 4 is a plan view of the rudder shaft and housing taken on line 4—4 of FIG. 3.

A metal sleeve 77 with a plurality of slits 78 on one end has a rubber ring 80 suitably bonded to its outer surface close to the other end 81. The inner periphery of end 81 of metal sleeve 77 has a pair of annular grooves to accommodate a pair of spaced O-rings. Such sleeve 77 slips into the central bore of metal pipe 70 such that the rubber ring 80 is under compression and becomes elongated to fully seal the entrance of any water into the hull of the boat. A rudder shaft such as shaft 15 is slid into the bore of the sleeve 77 and connected thereto as by clamping action of semicircular members 42 and 43 (shown in FIGS. 3 and 4) via bolts 45 on the one end of such sleeve 77 that has the slits 78. Such bolting to the rudder shaft provides a cost effective means for retrofitting rudder seals such as flax packing rings on boats and vessels. The dual seals of the annular rubber ring 80 and the gasket 71' assures a fluid tight seal to the bearing assembly for the rotative shaft 15.

A further modification of a bearing assembly and sealing means is shown in FIGS. 10 through 13 wherein the hull 17 of the ship or vessel is designated by the same numeral as the hull in the previously described embodiment. The hull 17 has a bore 82 for receiving an outer pipe or metal sleeve 83 that has a circular metal flange 84 secured as by a weld 85 to the outer mid portion of the outer pipe 83. Flange 84 has a plurality of circumferentially spaced bores 86 that are adapted to register with a plurality of circumferentially spaced bores 87 in an upper plate of the hull 17 to permit the securing of flange 84 and the bearing assembly to be described to the hull of the vessel by bolts 88. An annular gasket 89 is placed between th upper plate of hull 17 (FIG. 10) and the flange 84 to provide a fluid tight seal.

Figure 11:
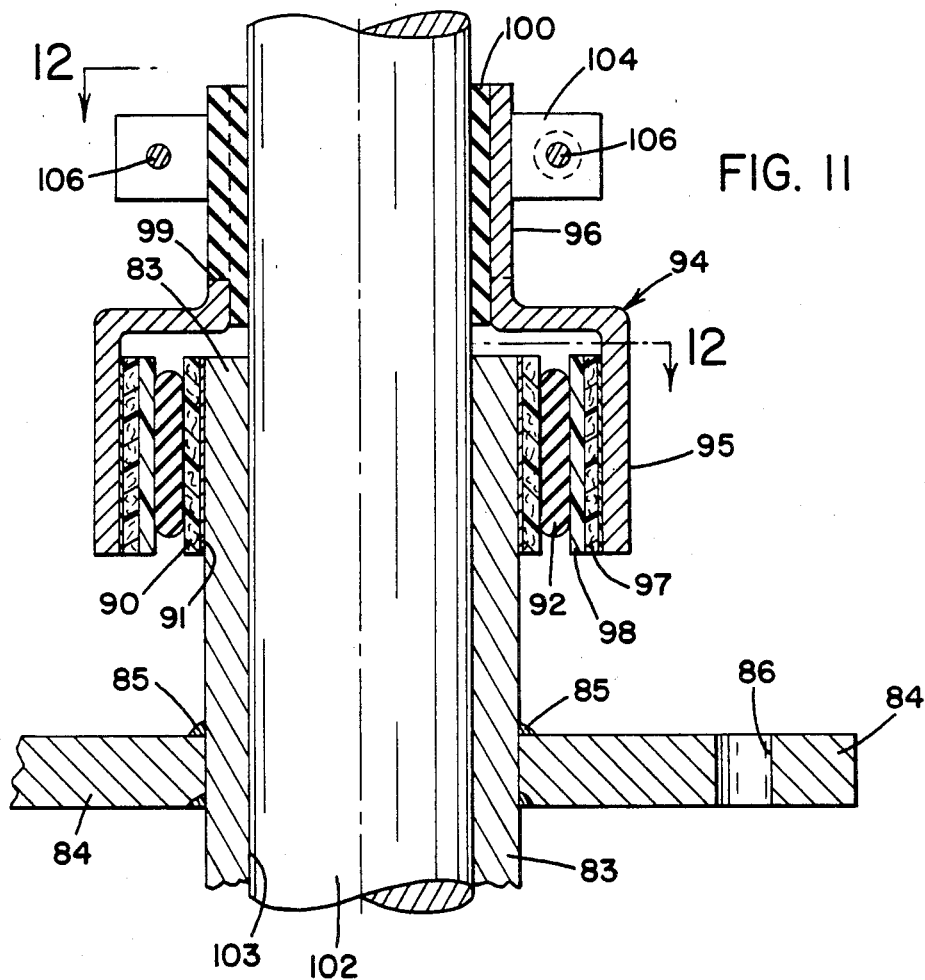
FIG. 11 is an enlarged side elevational view partly in section of the bearing assembly shown in FIG. 10.
Figure 13:
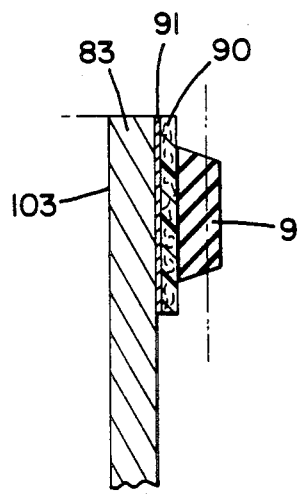
FIG. 13 is a fragmentary side elevational view in cross-section of a sleeve and its annular ring in a relaxed condition.

A fiberglass sleeve 90 is cemented (as by an annular film 91) to the uppermost exterior or outer surface of the outer pipe 83 (FIGS. 11 and 13). The inner periphery of a rubber or elastomeric ring 92 is then cemented or suitably adhered to the outer circumference of fiberglass sleeve 90 to form the yieldable member in the bearing assembly. After installation such rubber ring 92 will be under compression.

A metal tubular sleeve 94 with an enlarged portion 95 and a reduced portion 96 is positioned over the upper end of outer pipe 83. A fiberglass sleeve 97 is cemented or suitably bonded to the inner periphery of the enlarged portion 95 of tubular sleeve 94. A teflon sleeve 98 is bonded to the inner peripheral surface of fiberglass sleeve 97 such that the rubber ring 92 engages such teflon surface to facilitate its slipping on such surface in a manner to be described. The reduced portion 96 of tubular sleeve 94 has a plurality of circumferentially spaced slits 99 such that on bonding a rubber sleeve 100 onto the inner periphery of such reduced portion 96, the rubber of sleeve 100 will flow into the slits 99 to assure an integral unitary whole and bonding thereto.

A steering shaft 102 is received by the bore of the reduced portion 96 of sleeve 94 and the central bore 103 of the outer pipes 83. The upper portion of steering shaft 102, the rubber sleeve 100, and the reduced portion 96 of tubular sleeve 94 are clamped between a pair of semi-circular members 104 and 105 by bolts 106 for suitable connection to the steering mechanism of shaft 102 and the rudder connected thereto. With the upper portion 96 of sleeve 94 slit as at 99 and these voids filled with rubber during the molding process of making rubber sleeve 100 integral with the sleeve 94, the clamping by the semi-circular members 104 and 105 assures a fluid tight fit while permitting the bearing assembly's use as a retrofit unit.

In the operation of this described embodiment, with the tubular sleeve 94 firmly secured to the steering shaft 102, the rotation of shaft 102 by the steering mechanism will rotate the tubular sleeve 94 and its enlarged portion 95 along with rubber ring 92 which is in compression. Rubber ring 92 seals the bearing assembly while yielding in a circumferential direction and permitting rotation of the steering shaft 102. When an excessive degree of rotation of shaft 102 is effected along with rubber ring 92, such ring 92 will slide on the annular Teflon ® ring 98 while maintaining the fluid tight seal.

Figure 14:
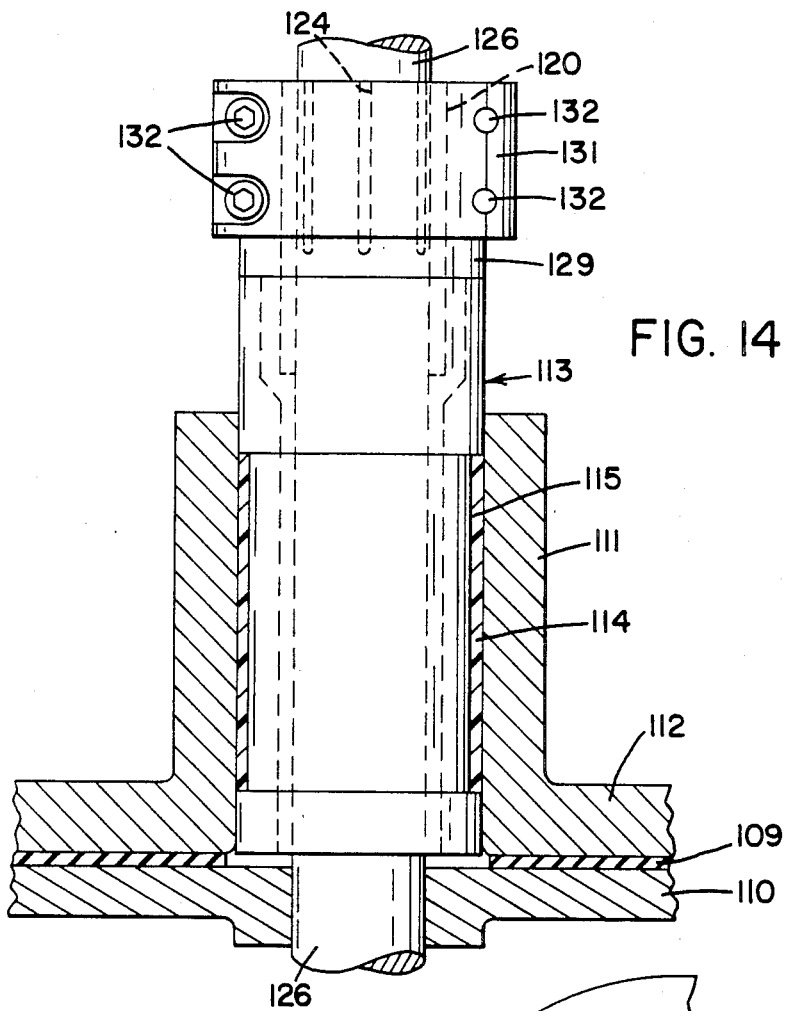
FIG. 14 is a side elevational view of a further modified embodiment of the bearing assembly and steering shaft, partly in cross section.
Figure 16:
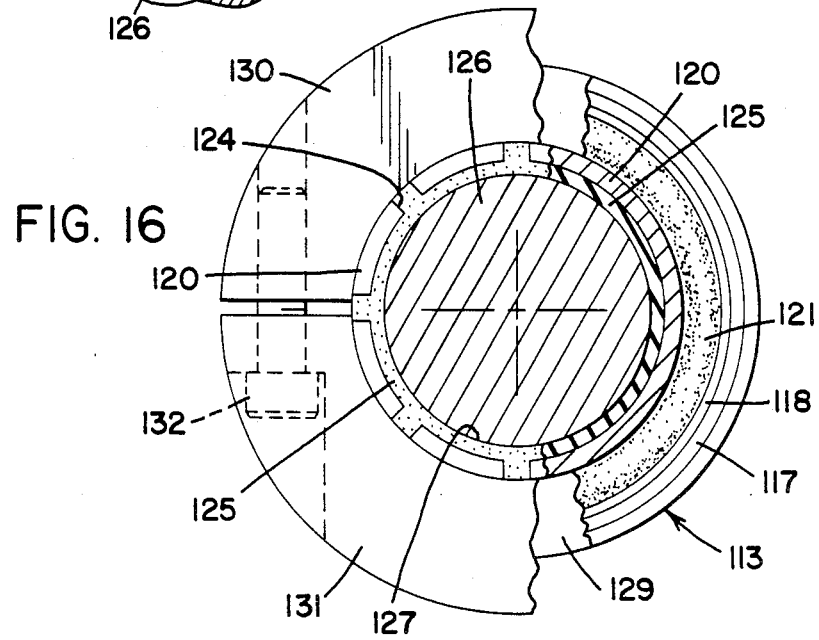
FIG. 16 is a further enlarged plan view of the bearing assembly and shaft taken on line 16—16 of FIG. 15.
Figure 15:
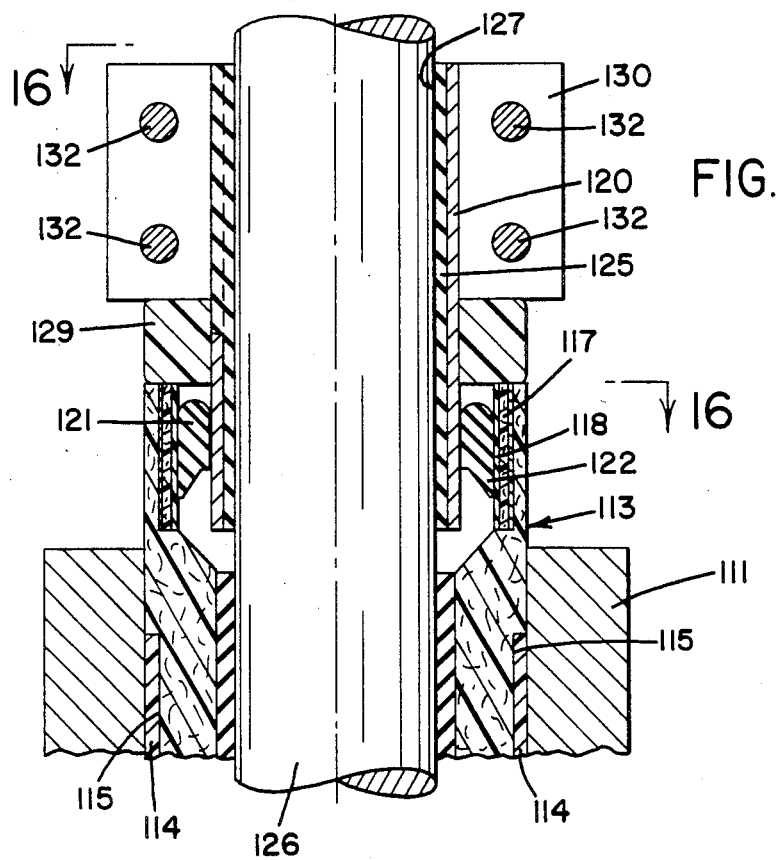
FIG. 15 is an enlarged side elevational view in cross section showing the sealing means.

A further modification of the described invention is shown in FIGS. 14 through 17 wherein the bearing assembly and rudder seal is mounted on the upper plate 110 of the hull as in the prior described embodiment with an annular seal or gasket 109 therebetween. Such bearing assembly has an outer cylindrical pipe 111 with a flange 112 on its lower end for attachment to the upper plate 110 of the hull as in the prior described embodiment shown in FIGS. 10 and 11. Outer pipe 111 has a fiberglass sleeve 113 suitably bonded thereto as by cement 114. The outer fiberglass sleeve 113 is recessed as at 115 along its intermediate portion as seen in FIG. 14 to receive the cement 114. Such recess 115 may be smaller, however, such recess in FIG. 14 is larger in size to illustrate a method of securing the bearing assembly being described to the inner peripheral surface of the cylindrical pipe 111. Fiberglass sleeve 113 extends upwardly beyond the outer pipe 111 having the same outside diameter but recessed on its upper inside portion to receive an annular fiberglass ring 117 that has a Teflon ® ring 118 bonded to its inner periphery. The annular fiberglass ring 117 is bonded to upper inside periphery of fiberglass sleeve 113 as shown in FIG. 15. In lieu of having a separate fiberglass ring 117 bonded t sleeve 113, the upper inside diameter portion of fiberglass 113 may be recessed and receive the Teflon ® ring 118.

A brass or metal tube 120 with an annular rubber seal 121 bonded to its outer lower circumference is positioned within the outer fiberglass sleeve 113 so that the rubber seal 121 frictionally engages the Teflon ® ring 118 on fiberglass ring 117. The annular seal 121 in the relaxed condition is generally rectangular in shape with an outwardly extending lip 122. On positioning tube 120 with its annular rubber seal 121 into abutting engagement with teflon ring 118, seal 121 is placed into compression assuring a fluid tight seal. Metal tube 120 has a rubber sleeve 125 bonded to its inner periphery for the full length thereof. The upper portion of metal tube 120 has a plurality of circumferentially spaced slits 124 such that on molding and bonding the rubber sleeve 125 into the tube 120, the rubber material forming the rubber sleeve 125 will flow into the slits 124 to assure an integral unitary whole and bond firmly thereto.

A steering shaft 126 is received by the bore 127 of rubber sleeve 125 and extends downwardly therefrom. An annular spacer 129 made from ultra high molecular weight polyethylene is positioned over the metal tube 120 and has its bottom annular surface resting on the uppermost portion of fiberglass sleeve 113 and sleeve 117.

The uppermost portion of steering shaft 126, the rubber sleeve 125 and the upper portion of metal tube 120 are clamped between a pair of semi-circular members 130 and 131 by bolts 132 for suitable connection to the steering mechanism of shaft 126 and the rudder connected thereto.

Figure 17:
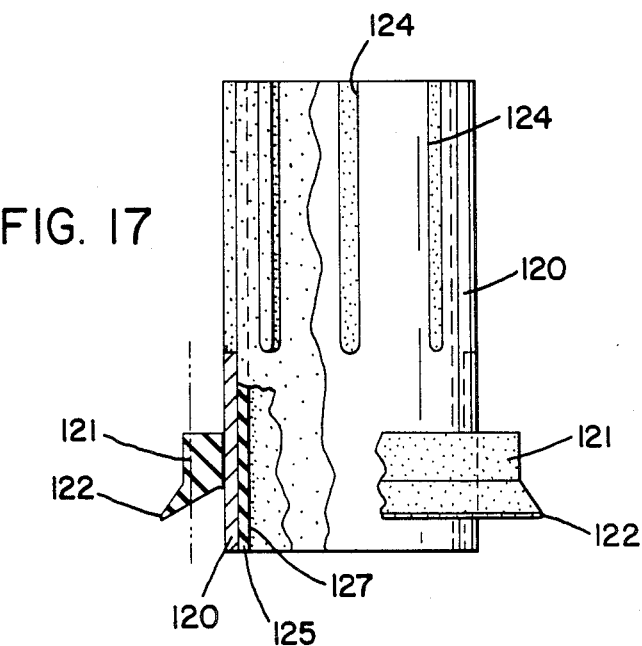
FIG. 17 is a side elevational view of a sleeve shown in FIG. 15 and its annular seal partly broken away and in cross-section.

In the operation of the last described embodiment with the brass or metal tube 120 firmly secured to the steering shaft 126, the rotation of the shaft 126 by the steering mechanism will rotate the steering shaft 126, tube 120 along with the annular rubber seal 121 which is under compression. The rubber annular seal 121 will provide some flexibility in the circumferential direction while yielding to a circular or circumferential rotation if excessive rotation is required, with such seal 121 rotating on the teflon ring 118 at such time while maintaining a positive seal from leakage. It must be remembered that annular rubber seal 121 is bonded to the metal sleeve or tube 120 which is a one piece structure as shown by FIG. 17.

Various modifications are contemplated and may obviously be resorted to by those skilled in the art without departing from the described invention as hereinafter defined by the appended claims, as only preferred embodiments thereof have been disclosed.

I claim:

1. A bearing assembly for use with a steering rudder for a ship comprising a cylindrical housing with an upper portion and a lower portion, said cylindrical housing having a central bore therethrough, said lower portion having a bearing secured to the central bore thereof, a rudder shaft journaled in said central bore and frictionally supported by said bearing for rotation, the upper portion of said shaft receiving a thin rubber sleeve, a fiberglass sleeve bonded to the outer surface of said rubber sleeve, an annular rubber ring bonded to the outer surface of said fiberglass sleeve, the upper portion of said cylindrical housing having a fiberglass ring bonded to said central bore thereof, a ring of antifriction material bonded to said fiberglass ring for frictional sliding engagement with said rubber ring and for putting said rubber ring under compression.

2. A bearing assembly as set forth in claim 1 wherein said annular rubber member is an elongated member.

3. A bearing assembly as set forth in claim 2 wherein the juncture of said upper portion and said lower portion of said cylindrical housing have a radially inwardly extending annular flange, said annular flange having a bore with a predetermined diameter, securing means on said fiberglass sleeve for securing said fiberglass sleeve to the upper portion of said shaft and having an exterior diameter greater than said predetermined diameter of said flange to retain said rudder shaft in a vertical position in said central bore.

4. A bearing assembly for use with a steering rudder comprising a tubular housing with a central bore, said housing having a fiberglass sleeve bonded to said central bore, said fiberglass sleeve having an inner peripheral surface, said inner peripheral surface of said fiberglass sleeve having a ring of low friction material adhered thereto, an oscillatable rudder shaft journaled in said tubular housing, said shaft having a thin elongated rubber sleeve encompassing the upper outer peripheral surface thereof, a fiberglass ring having its inner peripheral surface bonded to said rubber sleeve to form an integral unit, and an annular rubber member having its inner peripheral surface bonded to said fiberglass ring to provide a sliding contact and a yieldable member between said rubber member and said ring of low friction material wherein said annular rubber member is placed under compression, and said tubular housing having a bearing member located therein below said fiberglass sleeve for supporting said shaft for rotation.

5. A bearing assembly as set forth in claim 4 wherein said fiberglass ring has its upper end slotted by a plurality of circumferentially spaced slots to facilitate the clamping of said fiberglass ring to said rudder shaft.

6. A bearing assembly as set forth in claim 5 wherein said plurality of circumferentially spaced slots are filled with a rubber integral to said thin elongated rubber sleeve encompassing said rudder shaft.

7. A bearing assembly as set forth in claim 6 wherein said bearing member has a plurality of circumferentially spaced rubber staves contacting said shaft.

8. A replaceable bearing assembly for use with a steering rudder for a boat having a boat hull, a cylindrical pipe secured to said hull, said pipe having a flange, said flange having a plurality of bores therein, a flanged metal pipe, said metal pipe having a tubular portion with a central bore, said flanged metal pipe secured to said flange of said cylindrical pipe, the peripherial surface of said central bore of said metal pipe having an annular ring of fiberglass adhered thereto, a ring of low friction material adhered to the radially innermost surface of said fiberglass ring, a metal sleeve having an elongated annular elastomeric member bonded to the outer periphery thereof, said metal sleeve rotatably received by said central bore of said metal pipe with said annular elastomeric member in compression and frictionally engaging said ring of low friction material, said metal sleeve being slotted, a rudder shaft received by said metal slotted sleeve, and clamp means secured to said slotted portion of said metal sleeve to secure said rudder shaft to said slotted sleeve.

9. A replaceable bearing assembly for use with a steering rudder for a boat as set forth in claim 8 wherein said cylindrical pipe has a central cylindrical opening therethrough, an annular ring located within said cylindrical opening and secured to the inner wall of said cylindrical pipe, said annular ring spaced from said flange of said cylindrical pipe, said metal pipe having one end closely adjacent said annular ring and an annular gasket located between said flange of said cylindrical pipe and said flange on said flanged metal pipe.

10. A bearing assembly for use with a steering rudder for a ship comprising a cylindrical housing attached to the hull of such ship, said cylindrical housing having a central bore therethrough, said housing having a fiberglass sleeve bonded to the outer peripheral surface thereof, an annular rubber ring bonded to said fiberglass sleeve, a rudder shaft journaled in said central bore, a tubular sleeve mounted onto and secured to said shaft, said tubular sleeve having an upper portion and a lower portion, said lower portion having a sleeve of antifriction material bonded to its inner periphery for the frictional engagement by said annular ring and for placing said annular ring into compression, said upper portion of said tubular sleeve having an elastomeric ring bonded to the inner periphery for engagement with said shaft, and clamp means for securing said tubular sleeve and said elastomeric ring of said sleeve to said upper portion of said rudder shaft.

11. A bearing assembly as set forth in claim 10 wherein said lower portion of said tubular sleeve is of larger diameter than said upper portion of said tubular sleeve.

12. A bearing assembly as set forth in claim 11 wherein said upper portion of said tubular member has a plurality of circumferentially spaced slits for receiving and having bonded thereto said elastomeric ring.

13. A bearing assembly for use with a steering rudder of a ship comprising a cylindrical housing attached to the hull of such a ship, said cylindrical housing having a central bore, an elongated fiberglass sleeve bonded to the inner peripheral surface of said bore in said cylindrical housing, an elastomeric bearing element bonded to said fiberglass sleeve, a ring of anti-friction material attached to the upper inner periphery of said cylindrical housing, a steering shaft located in said central bore and received by said elastomeric bearing element, a metal tube mounted over said shaft, said tube having an elastomeric ring bonded to its inner periphery for engaging said shaft, a rubber ring secured to the outer periphery of said tube for frictionally engaging said ring of anti-friction material wherein said rubber ring is under radial compression for sealing said shaft permitting relative rotation therebetween.

14. A bearing assembly as set forth in claim 13 wherein said rubber ring has a radially outwardly projecting skirt in the uncompressed state.

* * * * *